Aug. 18, 1959  R. A. HERBRUCK  2,899,884
STORAGE CONTAINER

Filed Jan. 16, 1957  2 Sheets-Sheet 2

INVENTOR.
ROBERT A. HERBRUCK
BY
*Marechal, Biebel, French & Bugg*
ATTORNEYS

United States Patent Office 2,899,884
Patented Aug. 18, 1959

2,899,884

STORAGE CONTAINER

Robert A. Herbruck, Dayton, Ohio

Application January 16, 1957, Serial No. 634,453

6 Claims. (Cl. 99—235)

This invention relates to receptacles for storing commodities and more particularly to a sealed silo construction adapted to compensate for pressure changes within the silo.

Storage of agricultural crops, viz., corn, wheat, rice, peanuts, hay, silage and the like, in sealed silos is desirable, in certain instances, to eliminate the necessity for utilizing dehydrating procedures to prevent ruinous decomposition and decay which may occur in the ordinary type silo when the crop is stored with the moisture content at too high a level. In other instances, a sealed silo is effective in preventing a dehydrated crop from coming into contact with humid air, absorbing moisture and then decaying. For example, storage in an ordinary silo without deterioration is particularly difficult to achieve in a crop such as corn, which has a relatively high moisture content at maturity and which will readily absorb moisture from the air when stored dehydrated.

The ability to store crops containing their natural inherent moisture contents at maturity can provide a lengthened harvesting period by allowing harvesting at maturity and increased efficiency of harvesting machinery due to lower field losses. Further, air borne contaminants such as dust, insects and various fungi as well as rats, mice, birds and similar pests are excluded from the interior of the silo.

The present structure is useful not only in the agricultural field but can have application in the storage of comestibles generally and noncomestible commodities or materials which are preferably stored in the absence of excessive air to insure proper preservation.

When storing either moisture containing or dry comestibles, or commodities in a silo, that quantity of air trapped during the filling procedure, is capable of providing for limited chemical reaction, such as fermentation or decomposition, with a consequent increase in the gas pressure within the receptacle. It is possible for the reaction pressure to actually become great enough to rupture the silo and thereby not only to completely ruin the silo itself but also the stored comestibles. Large quantities of noxious reaction gases, principally carbon dioxide and nitrous oxide, may be concurrently discharged and, under some circumstances, constitute a definite health hazard. Even if the silo will contain the initial reaction gases, expansion and contraction due to changes in weather conditions will subject the silo to widely varying pressures. For example with a sudden decrease in the atmospheric pressure surrounding the silo, as in the case of a cyclone, the internal pressure is comparatively greatly enlarged and the silo while strong enough to contain the reaction gas under normal atmospheric conditions, cannot do so under the new ones and may rupture.

While pressure relief valves provide a partial solution toward alleviating sudden pressure changes, they are subject to fouling by solid particles carried in the escaping gas and must be cleaned often to maintain operability. Additionally, collapsible bags can be employed in the storage receptacle but they are subject to attack by the reaction products and further, are difficult to inspect and repair once the receptacle has become filled with noxious reaction gases.

It is therefore one of the principal objects of this invention to provide a sealed silo having means externally disposed of the storage chamber thereof to enable compensation of pressure changes and maintain the captive internal gas pressure within a safe operating range.

Another object of this invention is the provision of a sealed silo having connecting means between the storage chamber and the compensating means which is dislodgeable by a sudden change in pressure to vent the silo storage chamber to the atmosphere.

A further object of this invention is the provision of a sealed silo having a separate section containing a pressure compensating envelope, the envelope containing section being outside of the silo storage chamber and available for entry.

Other objects and advantages of this invention will be apparent from the following description, the accompanying drawings and the appended claims.

Figure 1:
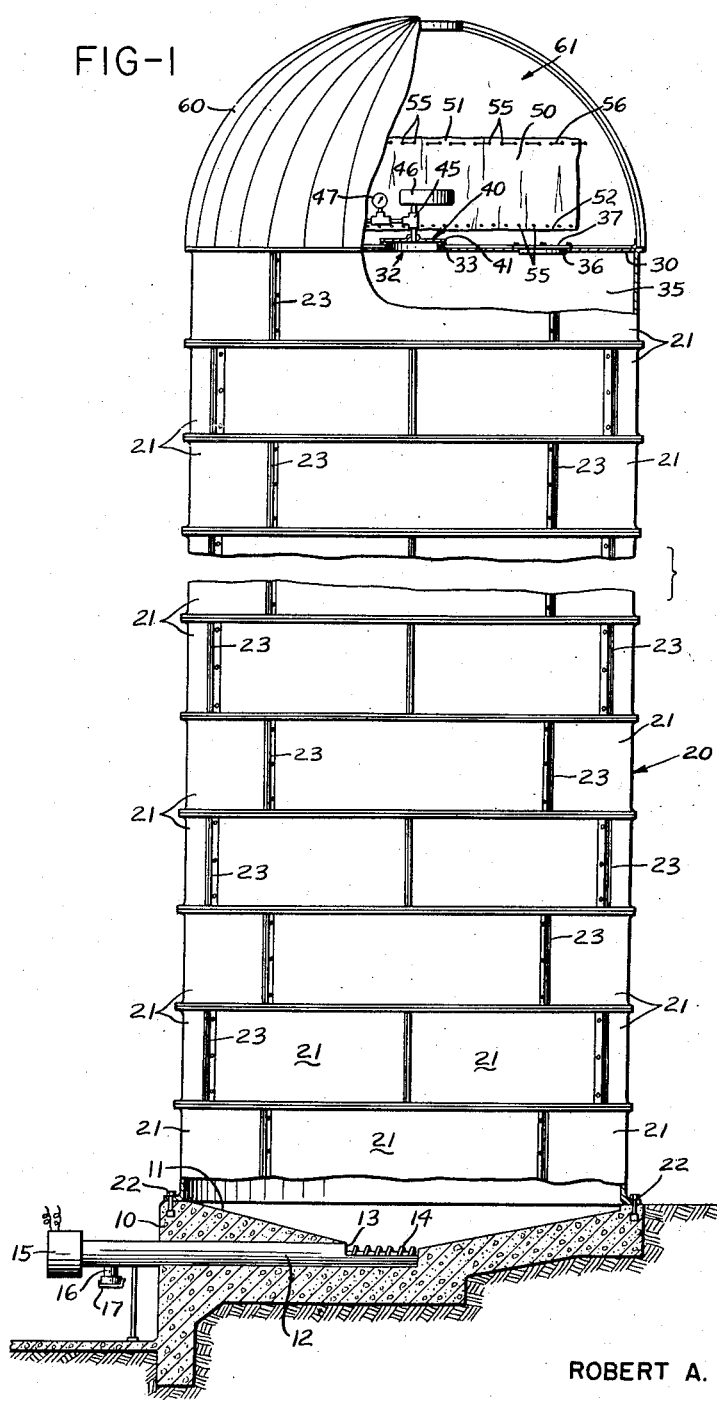
Fig. 1 is a side elevational view of a silo construction according to the present invention with portions of the foundation and wall broken away to show the inner construction thereof.
Figure 2:
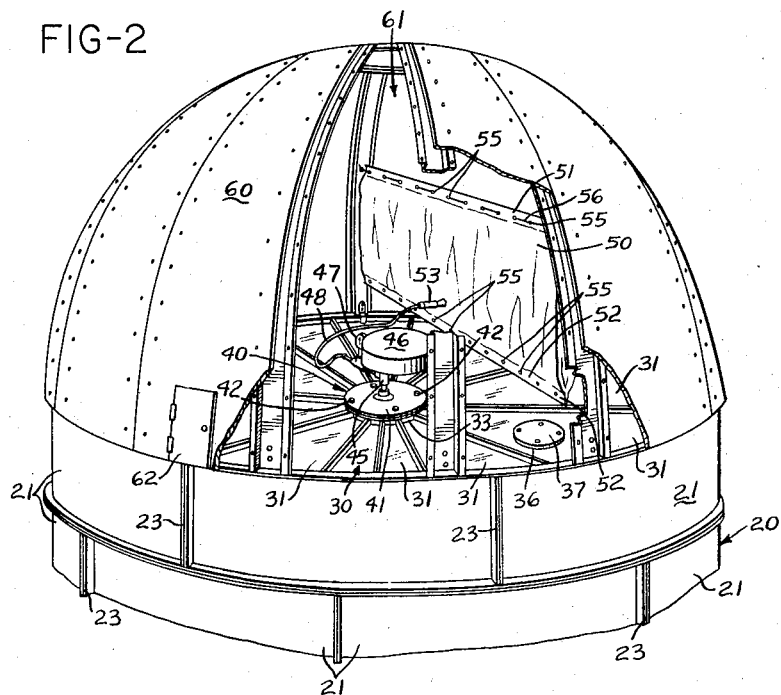
Fig. 2 is a perspective view of the upper end of the silo with a portion of the roof removed to show the pressure compensating means.

Referring to Fig. 1, which illustrates a preferred embodiment of a silo according to the present invention, a concrete foundation 10 having a recessed upper surface 11 is constructed with a feed tube 12 extending radially outwardly from the center thereof, the inner end of tube 12 being cut away longitudinally as shown at 13, so that stored material will gravitate into the tube for movement therethrough by a feed auger 14. Auger 14, driven by a motor 15, removes material from the cut away portion 13 and travels it along the tube to a point above outlet pipe 16, at which point the material is discharged when closure cap 17 is moved from its sealing position.

Extending upwardly from foundation 10, an elongated container body 20 made up of a plurality of curved sheet metal sections 21 which are riveted or welded together to form a unitary structure capable of holding a large quantity of a commodity, has its sections adjacent base 10 secured thereto by a plurality of bolts 22 which extend downwardly into the foundation as illustrated. To insure gas tight integrity of body 10, sealing strips 23, of mastic or the like, are disposed between the flanges of abutting sections 21 prior to the time that these parts are joined together into a single unit.

The upper end of container 20 is enclosed by a flat upper wall 30 constructed of sections 31 which define a generally centrally located opening 32. A collar 33 having an annular flange 34 adjacent the upper end thereof circumscribes opening 32, the opening being used for filling, or entering a storage chamber 35, which is defined by upper wall 30, the container body 20 and the foundation 10. Additional access means to gas tight storage chamber 35 is optionally afforded by a hatch 36, the closure 37 of which can either be made of metal or, alternatively, a transparent substance that will enable visual inspection of storage chamber 35 without the necessity for removing closure 37 and letting the gas contained within the storage chamber escape into the atmosphere. Provision for visual inspection means, apart from opening and entering chamber 35, proves advantageous since such procedure not only provides a fresh supply of oxygen to promote reaction or decomposition beyond that occasioned by the initial air supply but also may present a health hazard to the inspector due to the noxious reaction gases, viz., nitrous oxide and carbon dioxide.

After storage chamber 35 is filled, for example by means of a filling pipe 38 which is inserted through opening 32 (Fig. 3), a closure member 40 including a plate 41, is mounted on flange 34 and a series of bolts or pins 42 placed through mating holes in plate 41 and flange 34 to prevent lateral movement between the two members while allowing the plate to lift upwardly away from the flange. A neoprene gasket 43 is cemented to the undersurface of plate 41 to provide a seal between the flange and plate 41 preventing the escape of gas from storage chamber 35. Bolts 42 are not provided with any fastening means, their function being essentially to act as guide pins and prevent lateral movement of closure member 40. The weight of the closure member affords the only sealing pressure.

Figure 3:
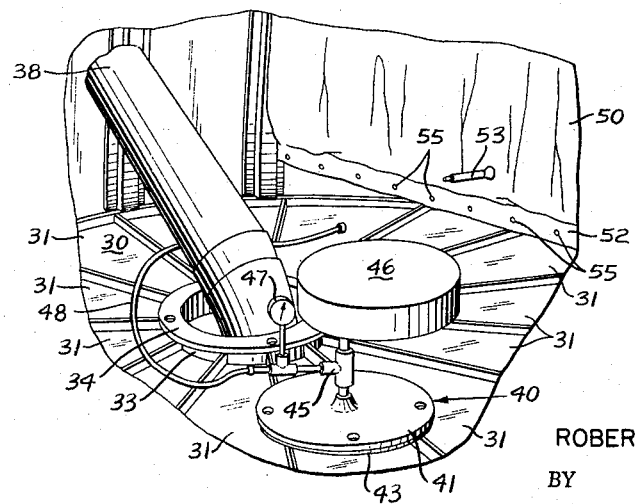
Fig. 3 is an enlarged fragmentary showing of the silo sealing and connecting means shown in Fig. 2.

The other components of closure member 40 comprise gas conducting tubes 45, pressure relief valve 46, pressure indicator 47 and an elongated flexible gas conducting hose 48 which is operably connected to the outlet end of tubes 45. Relief valve 46 and indicator 47 are preferably located on closure 40 as shown but can also be connected to the storage chamber 35 at any other desirable location. The valve 46 may be the usual bi-directional flap or diaphragm type valve, to provide for the flow of gas from or the flow of air into chamber 35 when the pressure differential between the inside and the outside of the chamber becomes great enough, the present valve 46 operating at about 2 ounces per square inch. Pressure indicator 47 shows the pressure within chamber 35 but is ancillary to operation of the compensating means and can be omitted where desired. By attaching the pressure relief valve and indicator onto closure member 40, there will be no tendency for these members to become filled with dust, hulls or other air-entrained contaminating materials which flow from storage chamber 35 during the filling thereof, due simply to the fact that they are set to one side during the filling, as shown in Fig. 3.

In the exemplary construction the combined weights of the components making up closure 40 approximate 35 pounds so that with the area of opening 32 being 175 square inches, an internal pressure of about 3 ounces per square inch is required to dislodge closure 40 from flange 34. Thus while under normal circumstances relief valve 46 will operate at 2 ounces per square inch to provide for pressure adjustment, should it become inoperative or prove inadequate, the closure will be dislodged at a slightly greater pressure and vent chamber 35 to the atmosphere. The weight of closure 40 can be varied as desired to alter the pressure necessary to dislodge it from its sealing position.

Attached to the other end of flexible tube 48 is an expansible gas impervious envelope or bag 50 having an upper binding 51 and a lower binding 52, as well as a flexible connecting tube 53 adjacent the lower binding for attachment to flexible tube 48. The bindings 51 and 52 are provided with a plurality of reinforced eyelets 55 through which is passed a supporting rod or cord 56. Envelope 50 can be made of any one of a number of available rubberized or plasticized fabrics which are impervious to the passage of gas. The envelope should have substantial capacity and for a silo 17 feet in diameter and 27 feet high, for example, it may have a height of approximately 3 feet and a width of 12 feet. For additional capacity additional envelopes may be added or the single envelope may be increased in size.

Mounted on the upper end of container body 20 a hemispherically shaped roof 60 defines a receiving chamber 61 in which the aforementioned closure member 40 and envelope 50 are mounted for protection from the weather. Roof or dome 60 is provided with an access door 62 which gives ready access to chamber 61 for repair or inspection of the envelope, opening 32 and hatch 36. Chamber 61 is open to the surrounding atmosphere and completely isolated from chamber 35 so that no particular precautions need be taken as to oxygen supply to enable workmen to enter the receiving chamber to work on the envelope 50 or closure member 40 while protected from inclement weather. Further, envelope 50 is completely accessible from all sides by a workman standing on the upper wall 30, which thus serves as a working platform. It is also significant that envelope 50 is completely isolated from storage chamber 35 so that any acids or other liquids formed by the comestible material cannot exert any harmful effect on the envelope, thus giving greatly increased envelope life. It is apparent that the effective storage capacity of the chamber 35 is significantly larger by placing envelope 50 outside of it than would otherwise be the case.

Considering now the operation, storage chamber 35 is filled by means of filling tube 38, which extends through access door 62 in roof 60, and closure member 40 placed in its sealing position with flexible tube 48 connected to pressure compensating envelope 50. When the initial reaction of the stored material commences, the gases formed raise the pressure within the container and the excess gas is transmitted into pressure relief envelope 50 which then swells or expands from its deflated condition. As soon as the initial oxygen supply is exhausted, the system will reach an equilibrium condition altered only by changing barometric and weather conditions or the removal of solids from the bottom of the silo by means of feeding tube 12 and auger 14. Minor variations in pressure are compensated for by the breathing action set up between storage chamber 35 and envelope 50 while the larger variations are compensated for by relief valve 46 or closure 40. Since reaction gases fill both the envelope and the chamber the chance of fresh air being drawn into the system is obviously lessened.

Additionally, should air pressure relief valve 46 become clogged by dust or other contaminants and unable to release excess gas or, in the event a cyclone causes a sudden, violent barometric change, closure means 40 will be dislodged from its sealing position thus venting the storage chamber 35 to the atmosphere and preventing rupturing of the silo or envelope 50.

While the form of apparatus herein described constitutes a preferred embodiment of the invention, it is to be understood that this invention is not limited to this precise form of apparatus, and that changes may be made therein without departing from the scope of the invention which is defined in the appended claims.

What is claimed is:

1. A silo construction for storing commodities in a pressure compensating controlled atmosphere comprising, a sealed container defining a storage chamber for a quantity of a commodity, said container having an upper wall providing a working platform, means located on the upper end of said container above said upper wall and cooperating therewith to form a protective receiving chamber open to the atmosphere, a gas retaining envelope supported within said receiving chamber above said storage chamber, and means connecting the interior of said envelope to the interior of said container for transmitting gas from one to the other to equalize pressure variations existing therebetween while maintaining said storage chamber sealed.

2. A silo construction for storing commodities in a pressure compensating controlled atmosphere comprising, a container body providing for storage of a quantity of a commodity, a foundation supporting said body and sealing the lower end thereof, a wall sealing the upper end of said body and cooperating with said foundation and said body to form a substantially gas tight chamber for storing said commodities, a roof on said container spaced above and cooperating with said upper end wall to form a protective receiving chamber open to the atmosphere, a gas retaining envelope supported within said receiving chamber above said storage chamber, and means connecting the interior of said envelope to said storage chamber for transmitting gas from one to the other to equalize pressure variations existing therebetween while maintaining said storage chamber sealed.

3. A silo construction for storing commodities in a pressure compensating controlled atmosphere comprising, a sealed container including an upper end wall defining a storage chamber capable of storing a quantity of a commodity and providing a working platform, a dome shaped roof on said container cooperating with said upper end wall to form a receiving chamber open to the atmosphere and enclosing said working platform, a gas retaining envelope supported within said receiving chamber above said upper end wall and accessible from said working platform, means defining a filling opening disposed in said upper wall, closure means dislodgeable by a predetermined increase in pressure within said storage chamber mounted on said opening defining means, and gas conducting means connecting the interior of said envelope to said storage chamber for transmitting gas from one to the other to equalize pressure variations existing therebetween and preventing escape of gas from said storage chamber.

4. A silo construction for storing commodities in a pressure compensating controlled atmosphere comprising, an elongated container providing for storage of a quantity of a commodity, a roof mounted on the upper end of said container, a horizontally disposed wall vertically spaced below said roof engaging the side walls of said container to separate said container into a lower sealed commodity enclosing storage chamber and into an upper receiving chamber open to the atmosphere, a gas retaining envelope supported within said receiving chamber above said horizontal wall and accessible from all sides by a person entering said receiving chamber, means defining a filling opening disposed in said horizontal wall, closing means dislodgeable by a predetermined increase in pressure within said storage chamber mounted on said opening defining means, and gas conducting means connecting the interior of said envelope to said storage chamber for transmitting gas from one to the other to equalize minor pressure variations existing therebetween while maintaining said storage chamber sealed.

5. A silo construction for storing commodities in a pressure compensating controlled atmosphere comprising, a container body providing for storage of a large quantity of a commodity, a foundation supporting said body and sealing the lower end thereof, a wall sealing the upper end of said body and cooperating with said foundation and said body to form a gas tight chamber for storing commodities in a controlled atmosphere, a roof on said receptacle cooperating with said upper wall to form a receiving chamber above said receptacle and open to the atmosphere, a gas retaining envelope supported within said receiving chamber above said upper wall, means defining a filling opening disposed in said upper wall, closure means dislodgeable by a predetermined increase in pressure within said storage chamber mounted on said opening defining means, gas conducting means joining the interior of said envelope to said storage chamber for transmitting gas from one to the other to equalize minor pressure variations existing therebetween, and a pressure relief valve operatively connected to said storage chamber providing for gas flow between said storage chamber and the atmosphere when the pressure differential therebetween exceeds a predetermined maximum.

6. A silo construction for storing commodities in a pressure compensating controlled atmosphere comprising, a container defining a storage chamber providing for storage of a quantity of a commodity, a wall sealing the upper end of said body to seal said storage chamber, a roof mounted on the upper end of said receptacle and cooperating with said upper wall to form an enclosed chamber open to the atmosphere into which a workman may enter, a gas retaining envelope supported within said enclosed working chamber above said upper wall and accessible to a workman on said upper wall, a collar having an annular flange on one end thereof mounted in said upper wall to define a filling opening, a closure plate dislodgeable by a predetermined increase in pressure within said storage chamber mounted on said annular flange, and gas conducting means extending through said closure plate joining said storage chamber to the interior of said envelope for transmitting gas from one to the other to equalize pressure variations existing therebetween.

References Cited in the file of this patent

UNITED STATES PATENTS

| | | |
|---|---|---|
| 1,358,629 | Flink | Nov. 9, 1920 |
| 2,111,839 | Chenicek | Mar. 22, 1938 |
| 2,643,602 | Martin | June 30, 1953 |
| 2,722,171 | Deringer | Nov. 1, 1955 |

FOREIGN PATENTS

| | | |
|---|---|---|
| 804,320 | France | Aug. 3, 1936 |
| 830,012 | France | May 2, 1938 |